United States Patent
VanBlon et al.

(10) Patent No.: US 10,165,111 B2
(45) Date of Patent: Dec. 25, 2018

(54) IDENTIFYING AN UNKNOWN CONTACT

(71) Applicant: LENOVO (Singapore) PTE, LTD., New Tech Park (SG)

(72) Inventors: Russell Speight VanBlon, Raleigh, NC (US); John Carl Mese, Cary, NC (US); Nathan J. Peterson, Durham, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 627 days.

(21) Appl. No.: 14/505,141

(22) Filed: Oct. 2, 2014

(65) Prior Publication Data

US 2016/0100050 A1  Apr. 7, 2016

(51) Int. Cl.
  *H04M 3/42* (2006.01)
  *H04W 4/16* (2009.01)

(52) U.S. Cl.
  CPC ......... *H04M 3/42042* (2013.01); *H04W 4/16* (2013.01)

(58) Field of Classification Search
  CPC .......... H04M 3/42059; H04M 3/4365; H04M 15/00; H04M 7/0036; H04M 15/83; H04M 15/8351; H04M 15/85; H04M 3/436; H04M 3/4878; H04M 15/61; H04M 15/8083; H04M 15/848; H04M 1/72572; H04M 3/42051; H04M 7/0051; H04M 15/8353
  USPC ............ 379/210.02, 201.01, 114.13, 142.05, 379/93.17, 114.14, 130, 142.01, 142.02, 379/142.09, 142.17, 188, 207.13, 211.02, 379/213.01, 252, 265.13, 72, 88.01, 379/88.02, 88.03, 88.19, 88.21, 88.23, 379/93.01, 93.12, 67.1, 207.02, 212.01, 379/266.07, 45, 93.03
  See application file for complete search history.

(56) References Cited

U.S. PATENT DOCUMENTS

| | | | | |
|---|---|---|---|---|
| 2010/0061532 A1* | 3/2010 | Takiguchi | ............. | H04M 15/00 379/142.06 |
| 2010/0119049 A1* | 5/2010 | Clark | ................ | H04M 3/42153 379/201.01 |
| 2010/0255820 A1* | 10/2010 | Maly | ..................... | H04M 1/271 455/414.1 |
| 2011/0151850 A1* | 6/2011 | Haaparanta | ......... | H04M 1/2745 455/415 |
| 2013/0005315 A1* | 1/2013 | Lemke | ............. | H04M 3/42195 455/415 |
| 2013/0183946 A1* | 7/2013 | Jeong | ..................... | H04W 4/16 455/414.1 |
| 2016/0134750 A1* | 5/2016 | Shen | ..................... | H04M 1/656 455/415 |

(Continued)

*Primary Examiner* — Akelaw Teshale
(74) *Attorney, Agent, or Firm* — Kunzler, PC

(57) ABSTRACT

For identifying an unknown contact, a system, apparatus, method, and computer program product are disclosed. The apparatus, in one embodiment, includes a processor, a memory that stores code executable by the processor, the code identifying an incoming call from an unknown contact, collecting relationship information regarding the unknown contact, and determining a relationship to a user based on the collected relationship information. In certain embodiments, the apparatus also includes code that provides a notification based on the determined relationship. In some embodiments, the apparatus also includes code that shares the determined relationship with one or more stored contacts.

20 Claims, 6 Drawing Sheets

(56) References Cited

U.S. PATENT DOCUMENTS

2016/0219142 A1\* 7/2016 Brown .............. G06Q 30/0241

\* cited by examiner

IDENTIFYING AN UNKNOWN CONTACT

FIELD

The subject matter disclosed herein relates to identifying a caller and more particularly relates to identifying an unknown contact.

BACKGROUND

Description of the Related Art

When receiving an incoming call or message, a user may not be able to identify the identity of the entity contacting them. Not knowing this information could result in not answering a potentially important call or answering the phone with little context about the subject of the communication.

Caller ID may show the phone number (or email address, etc.), but this does not necessarily help if they do not recognize the phone number. A user may wait to see if a caller leaves a voicemail to get detail or try to figure out the sender's identity based on the content of a text message or email, but this is inefficient and relies on the caller leaving a voicemail. Otherwise a user must draw on their memory or recent history of communication without certainty, but this can be difficult for infrequent contacts or when a person is busy.

BRIEF SUMMARY

An apparatus for identifying an unknown contact is disclosed. A method and computer program product also perform the functions of the apparatus. The program product, in one embodiment, includes a computer readable storage medium that stores code executable by a processor.

The apparatus, in one embodiment, includes a processor, a memory that stores code executable by the processor, the code identifying an incoming call from an unknown contact, collecting relationship information regarding the unknown contact, and determining a relationship to a user based on the collected relationship information. In certain embodiments, the apparatus also includes code that provides a notification based on the determined relationship. In some embodiments, the apparatus also includes code that shares the determined relationship with one or more stored contacts.

In some embodiments, the apparatus may also include code that identifies a plurality of close contacts and/or code that identifies a shared contacts database, wherein collecting relationship information includes polling a plurality of close contacts for information of recent communications with the unknown contact and/or searching the shared contacts database. In some embodiments, the apparatus also transcribes at least a beginning portion of a phone call, wherein determining a relationship includes identifying relational cues within the transcribed portion. In certain embodiments, collecting relationship information includes searching transcribed portions of prior phone calls.

In certain embodiments, collecting relationship information includes searching for a prior communication with the unknown caller. The prior communication may be a prior phone call and/or an electronic communication such as an electronic mail (e-mail) message, a short messaging service (SMS) message, and a multimedia messaging service (MMS) message.

The method, in one embodiment, includes detecting that an incoming call is from an unknown contact, determining a relational context for the unknown contact, and providing, to a user, a notification based on the relational context. In some embodiments, detecting that an incoming call is from an unknown contact may include searching a local contact list for the unknown caller and/or searching a call history for prior calls with the unknown caller within a predetermined time period. In some embodiments, the method also includes sending the relational context to one or more recipients selected from the group consisting of: a shared contacts database, a remote server, and a close contact.

In some embodiments, the method also includes polling close contacts for information regarding prior communications between a close contact and the unknown contact, wherein determining the relational context is based on the information regarding prior communications between a close contact and the unknown contact. In certain embodiments, the relational context may also be based on a relationship between the user and a close contact having prior communications with the unknown caller. In some embodiments, the method also includes identifying a prior communication with the unknown contact, wherein the provided notification includes an indication of the prior communication. In certain embodiments, the indication of the prior communication may identify a most recent communication.

The program product includes code to perform detecting that an incoming call is from an unknown contact, collecting relationship information regarding the unknown contact, determining a relational context for the unknown contact based on the collected relationship information, and providing, to a user, a notification based on the relational context. In some embodiments, collecting relationship information regarding the unknown contact may include searching for prior communications between the user and the unknown contact.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
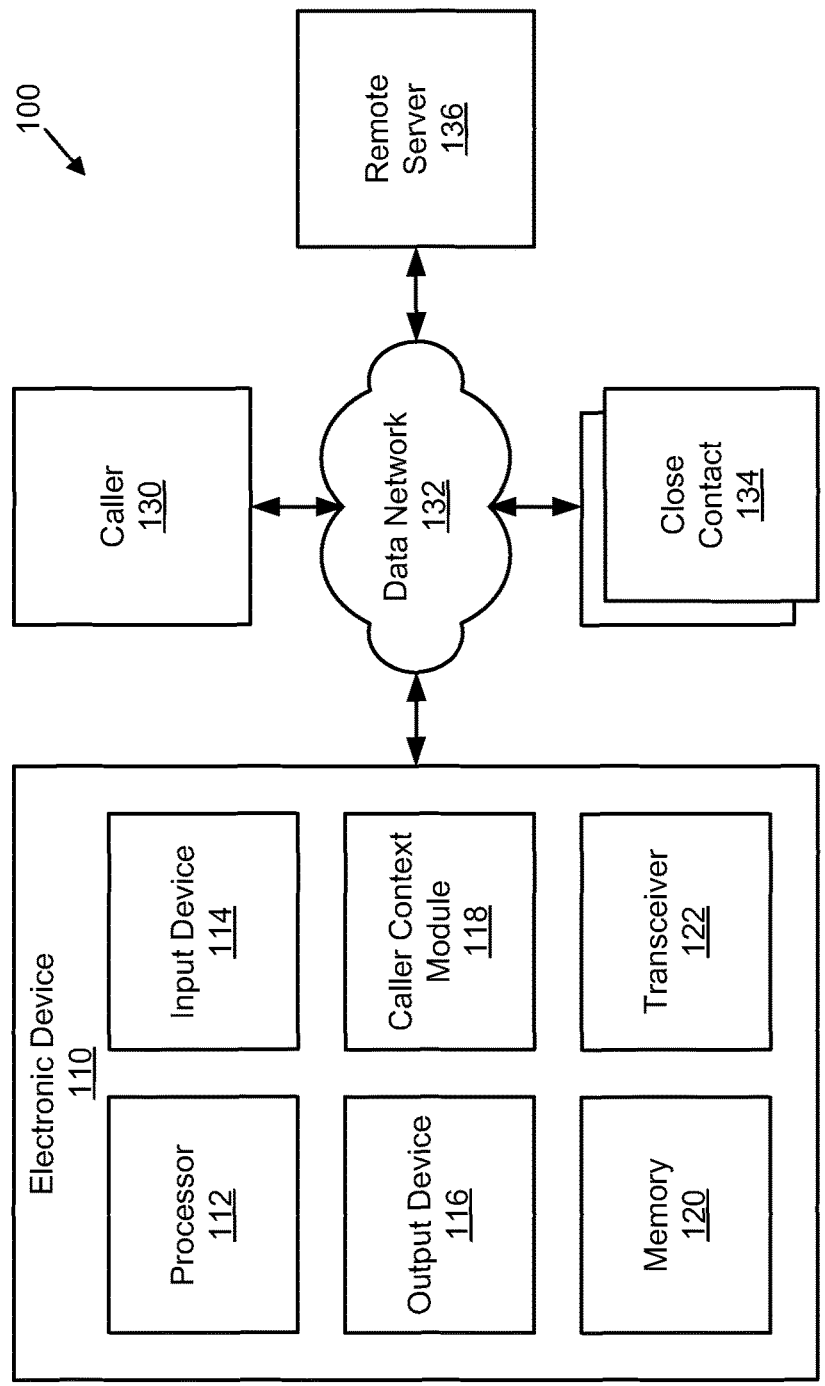
FIG. 1 is a schematic block diagram illustrating one embodiment of a system for identifying an unknown contact.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products collect information about a caller (or sender) who is unknown to the user (e.g., not saved as a contact) and provide context as to who is contacting them. In some embodiments, the information includes prior communication between the caller (or sender) and user. The caller (or sender) may be identified by the context of the communication and saved for future cross-referencing. For example, a public school automated system may call parents to inform school delay or inclement weather status. The call may be transcribed and/or tagged, so the caller may be easily identified the next time.

In certain embodiments, the information includes prior communication between the caller and one of the user's frequent contacts (e.g., family member, close friend, etc.). "Circles" of contacts could opt-in to sharing such information. For example, a wife's device shares info about a contractor with whom she has been in contact. The shared info may be displayed indicating who the contact is, in response to the contractor being in her "circle." In certain embodiments, the information includes email, text message, or electronic correspondence between the caller and user. Automatic linking could occur using name, context, or locating the phone number in an electronic correspondence.

FIG. 1 depicts a system 100 for indicating a message recipient, according to embodiments of the disclosure. The system 100 includes an electronic device 110 and a calling device 130 communicatively coupled via a data network 132. In some embodiments, the system 100 also include one or more close contacts 134 and a remote server 136 that stores contact records.

The electronic device 110 comprises a processor 112, an input device 114, an output device 116, a caller context module 118, a memory 120, and a transceiver 122. In some embodiments, the electronic device 110 includes a body or an enclosure, wherein the components of the electronic device 110 are contained within the enclosure. In some embodiments, the electronic device 110 includes a power source, for example a battery or a power adapter, which provides electrical power to components of the electronic device 110. In certain embodiments, components of the electronic device 110 are communicatively coupled to each other, for example via a computer bus.

The processor 112, in one embodiment, may comprise any known controller capable of executing computer-readable instructions and/or capable of performing logical operations. For example, the processor 112 may be a microcontroller, a microprocessor, a central processing unit (CPU), a graphics processing unit (GPU), an auxiliary processing unit, a FPGA, or similar programmable controller. In some embodiments, the processor 112 executes instructions stored in the memory 120 to perform the methods and routines described herein. The processor 112 is communicatively coupled to the input device 114, the caller context module 118, the output device 116, and the memory 120.

The input device 114, in one embodiment, may comprise any known computer input device including a touch panel, a button, a keyboard, or the like. For example, the input device 114 may include a handwriting input unit operatively coupled to the processor 112. In some embodiments, the input device 114 may be integrated with the output device 116, for example, as a touchscreen or similar touch-sensitive display. In some embodiments, the input device 114 comprises a touchscreen such that text may be input by using a virtual keyboard displayed on the touchscreen and/or by handwriting on the touchscreen. In some embodiments, the input device 114 comprises two or more different devices, such as a keyboard and a touch panel.

The output device 116, in one embodiment, is configured to output visual, audible, and/or haptic signals. In some embodiments, the output device 116 includes an electronic display capable of outputting visual data to a user. For example, the output device 116 may include an LCD display, an LED display, an OLED display, a projector, or similar display device capable of outputting images, text, or the like to a user. In certain embodiments, the output device 116 includes one or more speakers for producing sound, such as an audible alert or notification. In some embodiments, the output device 116 includes one or more haptic devices for producing vibrations, motion, or other haptic feedback.

In some embodiments, all or portions of the output device 116 may be integrated with the input device 114. For example, the input device 114 and output device 116 may form a touchscreen or similar touch-sensitive display. In other embodiments, the output device 116 may be located near the input device 114. The output device 116 may receive instructions and/or data for output from the processor 112 and/or the caller context module 118.

The caller context module 118, in one embodiment, is configured to detecting, by use of a processor, that an incoming call is from an unknown contact, collect relationship information regarding the unknown contact, and determine a relational context for the unknown contact based on the collected relationship information. The caller context module 118 may also provide, to a user, a notification based on the relational context. In certain embodiments, the caller context module 118 searches a shared contact database for entries matching an identifier (e.g., a name or phone number) of the unknown contact.

The caller context module 118 may be comprised of computer hardware, computer software, or a combination of both computer hardware and computer software. For example, the caller context module 118 may comprise circuitry, or a processor, configured to detect that an incoming call is from an unknown contact. As another example, the caller context module 118 may comprise computer program code that allows the processor 102 to collect relationship information regarding the unknown contact and determine a relationship to a user based on the collected relationship information. The caller context module 118 is discussed in further detail with reference to FIG. 2, below.

The memory 120, in one embodiment, is a computer readable storage medium. In some embodiments, the memory 120 includes volatile computer storage media. For example, the memory 120 may include a random access memory (RAM), including dynamic RAM (DRAM), synchronous dynamic RAM (SDRAM), and/or static RAM (SRAM). In some embodiments, the memory 120 includes non-volatile computer storage media. For example, the memory 120 may include a hard disk drive, a flash memory, or any other suitable non-volatile computer storage device. In some embodiments, the memory 120 includes both volatile and non-volatile computer storage media.

In some embodiments, the memory 120 stores data relating to identifying an unknown contact. For example, the memory 120 may store contacts, call history, electronic messages, call transcripts, relationship information, and the like. In some embodiments, the memory 120 also stores program code and related data, such as an operating system operating on the electronic device 110.

The transceiver 122, in one embodiment, is configured to receive electronic communications (e.g., a phone call, a video call, or a text message) via the data network 132. In certain embodiments, the transceiver 122 is a wireless transceiver capable of exchanging information via electromagnetic radiation (e.g., communication via radio frequencies, infrared, visible light, and the like) or sound (e.g., ultrasonic communication). In certain embodiments, the processor 112 is a wired transceiver capable of exchanging information via a transmission line (e.g., wire, data cable, or optical fiber). In some embodiments, the transceiver 122 receives messages from the remote server 136. In other embodiments, the transceiver 122 receives messages from one or more of the close contacts 134.

The calling device 130, in one embodiment, is configured to call (or send a message to) the electronic device 110 via the data network 132. In some embodiments, the calling device 130 is an electronic device comprising a processor, a memory, and a transceiver, similar to the electronic device 110. The calling device 130 may access the data network 132 via wired or wireless data links. Generally, the phone number (or address) of the calling device 130 is communicated to the electronic device 110 when the calling device 130 makes a call. In some embodiments, a name of the caller is also communicated to the electronic device 110 when the calling device 130 makes the call. In certain embodiments, identifiers for the calling device 130 are stored in a local contacts list or address book of the electronic device 110. In other embodiments, the calling device 130 is an unknown contact.

The data network 132, in one embodiment, is a telecommunications network configured to allow the electronic device 110, the calling device 130, any of the close contacts 134, and/or the remote server 136 to communicate data to each other. The communicated data may include digital data or analog data, including voice data, image data, signaling data, and electronic messages. The data network 132 may be comprised of wired data links, wireless data links, and/or a combination of wired and wireless data links. Examples of wireless data networks include, but are not limited to, a wireless cellular network, a local wireless network, such as a Wi-Fi network, a Bluetooth® network, a near-field communication (NFC) network, an ad hoc network, and/or the like. The data network 132 may include a wide area network (WAN), a storage area network (SAN), a local area network (LAN), an optical fiber network, the internet, or other digital communication network. In some embodiments, the data network 132 may include two or more networks. The data network 132 may include one or more servers, routers, switches, and/or other networking equipment. The data network 132 may also include computer readable storage media, such as a hard disk drive, an optical drive, non-volatile memory, random access memory (RAM), or the like.

In some embodiments, a wireless portion of the data network 132 may include a mobile telephone network. The wireless portion of the data network 132 may also employ a Wi-Fi network based on any one of the Institute of Electrical and Electronics Engineers (IEEE) 802.11 standards. Alternatively, the wireless portion of the data network 132 may include a BLUETOOTH® connection. In addition the wireless portion of the data network 132 may employ a Radio Frequency Identification (RFID) communication including RFID standards established by the International Organization for Standardization (ISO), the International Electrotechnical Commission (IEC), the American Society for Testing and Materials (ASTM), the DASH? Alliance, and EPC-Global.

Alternatively, the wireless portion of the data network 132 may employ a ZigBee connection based on the IEEE 802 standard. In one embodiment, the wireless portion of the data network 132 employs a Z-Wave connection as designed by Sigma Designs. Alternatively, the wireless portion of the data network 132 may employ an ANT and/or ANT+ connection as defined by Dynastream Innovations Inc. of Cochrane, Canada.

The wireless portion of the data network 132 may be an infrared connection including connections conforming at least to the Infrared Physical Layer Specification (IrPHY) as defined by the Infrared Data Association (IrDA). Alternatively, the wireless portion of the data network 132 may be a cellular telephone network communication. All standards and/or connection types include the latest version and revision of the standard and/or connection type as of the filing date of this application.

The one or more close contacts 134, in one embodiment, are configured to communicate with the electronic device 110 via the data network 132. For example, each close contact 134 may call or send a message to the electronic device 110. In some embodiments, each close contact 134 is an electronic device comprising a processor, a memory, and a transceiver, similar to the electronic device 110. The close contact 134 may access the data network 132 via wired or wireless data links. While only two close contacts 134 are depicted in FIG. 1, in other embodiments, the system 100 may be include any number of close contacts 134.

Generally, the close contact is an individual with whom the user enjoys a close relationship. Examples of close contacts include family members and close friends. Additionally, a close contact is an individual that grants the user access to the individual's contact list (or address book), call history, and/or records of recent electronic communications (e.g., text messages or emails). In some embodiments, a close contact may be identifiable through a special indicator in the user's contact entry corresponding to the close contact. In certain embodiments, the caller context module 118 will query or poll only contacts having the special indicator. In some embodiments, the close contact must grant permission to the user before the user may search the close contact's call history, text messages, stored email, and/or contacts database.

The remote server 136, in one embodiment, is a server accessible via the data network 132 and configured to store a plurality of contact entries. In some embodiments, the remote server 136 comprises a remote copy of the contact entries stored on the electronic device 110 (i.e., the user's contact list or address book). In certain embodiments, the remote server 136 stores a shared contacts database accessible by the electronic device 110 and one or more of the close contacts 134. In further embodiments, the shared contacts database may include contacts from the electronic device 110 as well as contacts from one or more of the close contacts 134. For example, the shared contacts database is maintained by the user and one or more close contacts. In some embodiments, the remote server 136 responds to polls or queries by the caller context module 118 for contact entries in the shared contacts database that match identifiers of the unknown contact. In some embodiments, the remote server 136 grants the caller context module 118 with access to the shared contacts database, wherein the caller context module 118 searches the shared contacts database for entries matching characteristics of the unknown contact.

In some embodiments, the remote server 136 may provide one or more messaging services. For example, the electronic device 110 and/or the close contacts 134 may access the messaging service using a web browser or the like. Examples of messaging services that may be supported by the remote server 136 include, but are not limited to, email, short messaging service (SMS), text messaging, multimedia messaging service (MMS), instant messaging, and the like.

In some embodiments, the remote server 136 may provide a social networking service. For example, the remote server 136 may maintain a plurality of social network accounts and a plurality of connections between the social network accounts. In some embodiments, the remote server 136 responds to polls or queries by the caller context module 118 for relationship information regarding the unknown contact. For example, the remote server 136 may provide one or more search results in response to a search request from the caller context module 118. In some embodiments, the remote server 136 provides an authenticated user with access to a social network account belonging to the authenticated user. For example, if a user of the electronic device 110 has a social network account on the remote server 136, the remote server 136 may grant the caller context module 118 with access to the social network account.

Figure 2:
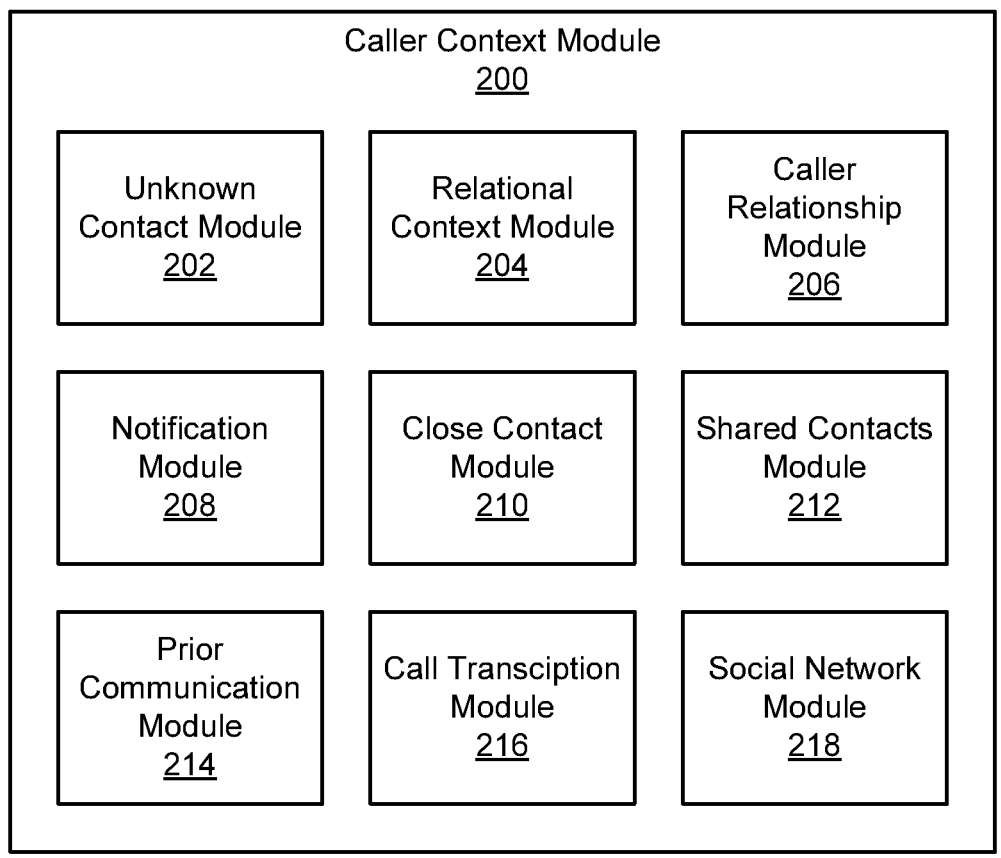
FIG. 2 is a schematic block diagram illustrating one embodiment of an apparatus for identifying an unknown contact.

FIG. 2 depicts a caller context module 200 for indicating a message recipient, according to embodiments of the disclosure. In some embodiments, the caller context module 200 may be similar to, and perform the same functions as, the caller context module 118 described above with reference to FIG. 1. In some embodiments, the caller context module 200 may be part of a messaging device, such as the electronic device 110.

In general, as described above, the caller context module 200 identifies an active messaging window, determines a correspondent (i.e., a message recipient) associated with the active messaging window, and provides a message recipient cue in the active messaging window, the message recipient cue based on the determined correspondent. In some embodiments, the caller context module 200 may also remove the message recipient cue after a predetermined interval such that the message recipient cue is a temporary cue. In certain embodiments, the caller context module 200 retrieves a visual identifier of the correspondent, wherein the message recipient cue is based on the visual identifier.

The caller context module 200, in one embodiment, includes an unknown contact module 202, a relational context module 204, and a caller relationship module 206. In some embodiments, the caller context module 200 also includes one or more of a notification module 208, a close contact module 210, a shared contacts module 212, a prior communication module 214, and/or a call transcription module 216. The modules of the caller context module 200 may be communicatively coupled to one another.

The unknown contact module 202, in one embodiment, is configured to identify an incoming call from an unknown contact. As used herein, an incoming call refers to an incoming electronic communication. Examples of incoming calls includes incoming phone calls (e.g., using the signaling system no. 7 (SS7) protocol, the Session Initiation Protocol (SIP), the H.323 protocol, or other suitable signaling protocol), an incoming chat request or invitation, an incoming text message, an incoming multimedia message, an incoming email, and the like. In some embodiments, the unknown contact module 202 monitors incoming calls to detect that an incoming call is from an unknown contact. The unknown contact may include a caller for which caller ID information (e.g., calling number and/or name) is available, but where the caller is not in the user's contacts and/or where the caller calls the user infrequently (i.e., the number of calls from the caller is below a threshold) and has not called recently (i.e., within a predetermined time period of the current date).

In some embodiments, the unknown contact module 202 determines whether the caller is an unknown contact. In certain embodiments, the unknown contact module 202 may determine that an incoming call is from an unknown contact based on whether the caller matches an entry in a local contacts list or database. For example, the unknown contact module 202 may detect that an incoming call is from an unknown contact by searching a local contact list for the caller. In certain embodiments, the unknown contact module 202 may determine that an incoming call is from an unknown contact based on recent call history. For example, the unknown contact module 202 may detect that an incoming call is from an unknown contact comprises searching a call history for prior calls with the unknown caller within a predetermined time period.

The relational context module 204, in one embodiment, is configured to determine a relational context for the unknown contact. In some embodiments, the relational context module 204 collects relationship information regarding the unknown contact and determines the relational context based on the collected relationship information. Relationship information may include prior communications with the unknown contact, an occupation of the unknown contact, and keywords or other indicators of a relationship with the unknown contact. In some embodiments, the relational context module 204 gathers the relationship information in real-time in response to the unknown contact module 202 detecting an incoming call from an unknown contact. In other embodiments, the relational context module 204 gathers the relational information during periods of inactivity for the electronic device 110, compiles the gathered information into a local database, and searches the local database in response to the unknown contact module 202 detecting an incoming call from an unknown contact.

In some embodiments, the relational context module 204 determines the relational context by polling a plurality of close contacts for information of recent communications with the unknown contact. In some embodiments, the relational context is further based on a relationship between the user and the close contact having prior communications with the caller. In some embodiments, the relational context module 204 determines the relational context by searching a shared contacts database. The shared contacts database, in one embodiment, may include contacts from the user's local contacts database (or list) as well as contacts from one or more close contacts. In some embodiments, the relational context module 204 searches the shared contacts database for entries matching characteristics of the unknown contact (e.g., phone number, address, or name).

In some embodiments, the relational context module 204 determines the relational context by searching a social network account of the user for relationship information regarding the unknown contact. For example, the relational context module 204 may search the user's social network connections for names, numbers, or other personal information matching the unknown contact. The relational context module 204 may further query the social network for occupational information for the unknown contact.

In some embodiments, the relational context module 204 determines the relational context by searching for a prior communication between the user and the caller (e.g., the unknown contact). Examples of prior communication include a phone call, an electronic mail (email) message, a short messaging service (SMS) message, a text message, and a multimedia messaging service (MMS) message, and the like. In some embodiments, the relational context module 204 determines the relational context by searching a transcribed portion of a prior phone call with the unknown contact. The relational context module 204 may search for identifiers of the caller (e.g., the caller's name, number, occupation, and/or address).

In some embodiments, the relational context module 204 scans the content of the prior communications for relational cues or other relationship information. Relational cues are keywords or other indicators of a relationship between the sender and the recipient. Relational cues may indicate a type of relationship between the sender and the recipient, for example a personal relationship (e.g., friendship, classmates, teammates, etc.), a familial relationship (e.g., siblings, parent/child, cousins, etc.), or a professional relationship (e.g., coworker, professional acquaintance, service provider, etc.). In certain embodiments, the relational context module 204 may search for relational cues in a database indexed by address or phone number of the caller.

The caller relationship module 206, in one embodiment, is configured to determine a relationship to a user based on the collected relationship information (e.g., the relational context), including that no prior relationship exists. In some embodiments, the caller relationship module 206 determines a type of relationship, including a personal relationship (e.g., friendship, classmates, teammates, etc.), a familial relationship (e.g., siblings, parent/child, cousins, etc.), or a professional relationship (e.g., coworker, professional acquaintance, service provider, etc.). Beneficially, knowledge of the relationship allows the user to make an informed choice when deciding whether to answer an incoming call.

In some embodiments, the caller relationship module 206 determines the relationship to the user based, at least in part, on the prior communication. For example, the caller relationship module 206 may determine that a caller (the unknown contact) is an email correspondent based on recent emails from the caller stored on the electronic device 110. In some embodiments, the caller relationship module 206 determines the relationship to the user by analyzing relational cues and other keywords within the collected relationship information. For example, the caller relationship module 206 may identify that an unknown contact is a classmate based on prior communications and other information gathered from a social network.

In some embodiments, the caller relationship module 206 determines the relationship to the user based on a close contact's contact list. For example, the caller relationship module 206 may determine that the unknown contact is a family member's doctor based on that family member's In Case of Emergency (ICE) contacts. In some embodiments, the relationship with the unknown contact is based on a relationship between the user and a close contact having prior communication with the unknown contact. For example, if the close contact is the user's spouse and has been in regular communication with the unknown contact, the caller relationship module 206 may determine that the unknown contact is a regular correspondent of the spouse. Further, analysis of the relational context may reveal that the unknown contact has a contact list entry in the spouse's phone under the heading "contractor." Accordingly, the caller relationship module 206 may determine that the unknown contact is the family's contractor whose usual point of contact is the user's spouse.

The notification module 208, in one embodiment, is configured to provide a notification based on the determined relationship. The notification may occur in response to the caller relationship module 206 determining the relationship to the user. In some embodiments, the notification module 208 provides the notification on a user interface (e.g., a display or notice window) adjacent to one or more items of caller identification (e.g., a number and/or name of the unknown contact). In certain embodiments, the notification module 208 provides a temporary notification. For example, the notification may disappear (e.g., fade away) after a predetermined time.

In some embodiments, the notification module 208 may control an output device, such as the output device 116, to generate one or more of an audible notification, a visual notification, and/or a haptic notification. For example, the notification module 208 may generate a pop-up visual notification as well as an audible tone or a vibration. Examples of audible notifications include, but are not limited to, playing a tone or tune, playing a voice recording, and playing a computer generated voice.

In certain embodiments, the notification module 208 displays the relationship between the user and the unknown contact, including that no prior relationship exists. In some embodiments, the notification module 208 indicates a relationship type (e.g., friend, family, acquaintance, coworker, classmate, social network connection, or service provider). For example, the notification may indicate that the caller is a service provider (e.g., dentist or mechanic) for a family member of the user (e.g., for a spouse).

In some embodiments, the notification module 208 is further configured to provide the relational context to the user. For example, the notification module 208 may include an indication of prior communication (e.g., a date of the latest communication) between the user and the unknown contact and/or between a close contact and the unknown contact. As another example, the notification module 208 may indicate a form (e.g., phone call, text message, or email) of a most recent communication between the user and the unknown contact.

In some embodiments, the notification module 208 may be activated and/or deactivated by user instruction. For example, the notification may include an option to discontinue future notifications associated with the same unknown contact. While depicted as a separate module, in one embodiment, the notification module 208 comprises a sub-module of the caller relationship module 206.

The close contact module 210, in one embodiment, is configured to identify a plurality of close contacts. Generally, the close contact is an individual that grants the user access to the individual's contact list (or address book), call history, and/or records of recent electronic communications (e.g., text messages or emails). In some embodiments, a close contact may be identifiable through a special indicator in the user's contact entry corresponding to the close contact. In certain embodiments, the close contact module 210 will identify the plurality of close contacts based on which contact entries contain the special indicator.

In certain embodiments, the close contact module 210 queries each close contact for contact entry information relating to the unknown contact. For example, the close contact module 210 may request access to and search a contacts list or database of one or more of the user's close contacts for records matching the unknown contact's information (e.g., name or phone number). In some embodiments, the close contact module 210 polls the one or more close contacts for contacts entries matching the unknown contact's information. In certain embodiments, close contact module 210 may determine whether a relationship exists between the close contact and the unknown context based on the close contact's contact entries. For example, the close contact module 210 may determine that the unknown contact is a family member of the close contact.

In some embodiments, the close contact module 210 polls each close contact for information regarding recent communications with the unknown contact. Recent communications may include phone calls, text messages, email, and the like. In certain embodiments, the close contact module 210 polls for communications with the unknown contact that have occurred within a predetermined time period (e.g., thirty days), any communications outside this time period being considered not recent. In some embodiments, the information received from the close contacts regarding recent communications with the unknown contact may include a date/time and a communication type (e.g., phone call). In further embodiments, the information received may include a communication frequency. The close contact module 210 may then provide the information received from the close contacts to the relational context module 204, where in the relational context module 204 determines a relational context based on prior communications between a close contact and the unknown contact.

In some embodiments, the close contact module 210 is configured to identify a relationship type between the user and the close contact. The close contact module 210 may determine this relationship type based on contact information on the user's device. For example, a contact entry on the user's phone corresponding to the close contacts may include a relationship field or note describing the relationship (e.g., friend, family member, coworker, etc.). As another example, the close contact module 210 may prompt the user to describe a relationship type and store that information in memory. The relationship between the user and the close contact may be used, for example by the relational context module 204 and/or caller relationship module 206, to determine the relationship between the user and the unknown contact. While depicted as a separate module, in one embodiment, the close contact module 210 comprises a sub-module of the relational context module 204.

The shared contacts module 212, in one embodiment, is configured to identify and access a shared contacts database. The shared contacts database, in one embodiment, is hosted remotely from the user device (e.g., on the remote server 136). In certain embodiments, the shared contacts database may include contacts from the user's local contacts database (or list) as well as contacts from one or more close contacts. For example, the shared contacts database may be on a corporate server and may include corporate contacts. As another example, the shared contacts database may be part of a social network and may include contacts from members of the social network. In some embodiments, the shared contacts module 212 searches the shared contacts database for entries matching characteristics of the unknown contact (e.g., phone number, address, or name). In other embodiments, the shared contacts module 212 grants access to the shared contacts database to the relational context module 204, wherein the relational context module 204 searches the shared contacts database for entries matching characteristics of the unknown contact.

In some embodiments, the shared contacts module 212 adds contacts from a local contacts list to the shared contacts database. For example, the shared contacts module 212 may monitor, or periodically search, for newly added contacts and upload the new contacts to the shared contacts database. In certain embodiments, the shared contacts database is maintained by the user and one or more close contacts. While depicted as a separate module, in one embodiment, the shared contacts module 212 comprises a sub-module of the relational context module 204.

The prior communication module 214, in one embodiment, is configured to search for a prior communication between the user and the caller (e.g., the unknown contact). In some embodiments, the prior communication is an electronic communication such as a phone call, an electronic mail (email) message, a short messaging service (SMS) message, a text message, and a multimedia messaging service (MMS) message, or the like. In certain embodiments, the prior communication module 214 searches a call history for calls involving the unknown contact. In certain embodiments, the prior communication module 214 maintains a communication log for all forms of communication between unknown callers and the user and searches the same for prior communications. In some embodiments, the prior communication module 214 provides the prior communication to the relational context module 204, wherein the relational context includes any prior communication between the user and the unknown contact. In some embodiments, the prior communication module 214 provides the prior communication to the caller relationship module 206, wherein the relationship to the user is based, at least in part, on the prior communication.

In some embodiments, the prior communication module 214 provides the prior communication with the unknown contact module 202, wherein the unknown contact module 202 determines whether a caller is an unknown contact based, at least in part, on the prior communications. Alternatively, the prior communication module 214 may provide an indication to the unknown contact module 202 whether prior communication recently occurred between the user and the caller. In certain embodiments, the unknown contact module 202 may categorize a caller as an unknown contact if there is no recent communication between the caller and the user (e.g., within a predetermined time period). Thus, the prior communication module 214 may search only for prior communications within a predetermined time period. For example, the prior communication module 214 may ignore prior communications outside the predetermined time period (e.g., two weeks) as these communications are insufficiently recent for the unknown contact module 202. Accordingly, the prior communication module 214 may indicate to the unknown contact module 202 that no recent communications exist in response to a communication log containing no prior communications within the predetermined time period.

In some embodiments, the prior communication module 214 provides the prior communication to the notification module 208, wherein the notification module 208 notifies the user of the prior communication. For example, the prior communication module 214 may identify that the unknown caller send multiple emails or text messages to the user over the past month and the notification module 208 may notify the user of the same. As another example, the prior communication module 214 may identify the time (e.g., date) of a most recent communication (e.g., phone call) between the user and the unknown caller and the notification module 208 may notify the user of the same. While depicted as a separate module, in one embodiment, the prior communication module 214 comprises a sub-module of the relational context module 204 and/or the caller relationship module 206.

The call transcription module 216, in one embodiment, is configured to transcribe at least a beginning portion of a phone call from the unknown contact. The call transcription module 216 may automatically transcribe the phone call from the unknown contact or may be manually activated. As the caller will often identify himself/herself in the beginning portion of the phone call, the call transcription module 216 may identify descriptors of the caller—such as title, occupation, and the like—within the transcribed portion of the phone call. Thus, the transcribed portion may include relational cues or other information used to determine relational context, for example a relationship between the caller and the user.

In some embodiments, the call transcription module 216 associates the relational cues with caller identifiers (e.g., the caller's name, number, or address) and stores the associated relational cues in local memory. For example, the call transcription module 216 may store the relational cues in a database indexed by address or phone number of the caller. The call transcription module 216 may provide the relational cues to the relational context module 204 in response to the unknown contact module 202 determining that a caller is an unknown contact. While depicted as a separate module, in one embodiment, the call transcription module 216 comprises a sub-module of the relational context module 204.

The social network module 218, in one embodiment, is configured to search a social network account of the user for relationship information regarding the unknown contact. In some embodiments, the social network module 218 searches the user's social network connections for names, numbers, or other personal information matching the unknown contact. For example, if a call is received from a Jane Doe, the electronic device may access one or more social networks to which the user belongs and search for contacts or connections in the social network matching the name Jane Doe or Jane Doe's number, as indicated by caller ID.

In response to the unknown contact being a social network connection of the user, the social network module 218 may determine a connection type (e.g., a level of closeness, a degree of connectedness) and/or an activity level between the user and the unknown contact, the relationship information including the connection type and/or activity level. In one embodiment, the activity level (and thus the relational context) may be based on a frequency of communications between the user and the unknown contact (e.g., messaging via the social network), a number of interactions between the user's social network account and the unknown contact's account (e.g., posting or commenting on each other's accounts), and the like. For example, the electronic device may discover that unknown contact is a longtime acquaintance of the user, but has little interaction with the user via the social network.

In some embodiments, the social network module 218 queries the social network for occupational information for the unknown contact. The social network module 218 may provide the relationship information to the relational context module 204. While depicted as a separate module, in one embodiment, the social network module 218 comprises a sub-module of the relational context module 204.

FIGS. 3A-3D depict embodiments of an electronic device 300 for identifying an unknown contact. The electronic device 300, in one embodiment, is substantially similar to the electronic device 110 discussed above with reference to FIG. 1. In further embodiments, the electronic device 300 may comprise a caller context module substantially similar to the caller context module 118 and/or the caller context module 200 discussed above with reference to FIGS. 1 and 2. As depicted, the electronic device 300 includes a display (e.g., a touchscreen display) showing a user interface 302 to a user of the electronic device 300.

Figure 3A:
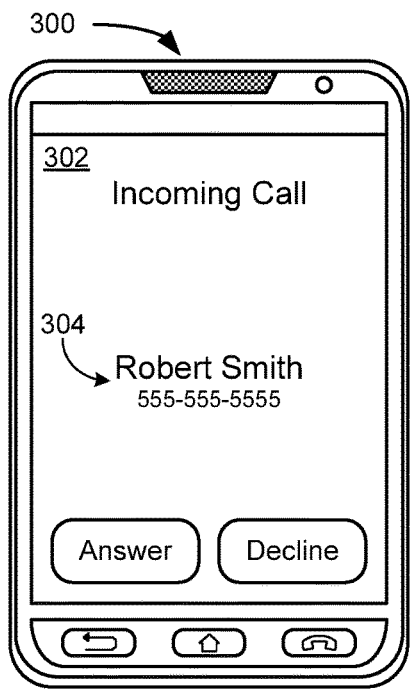
FIG. 3A is a diagram illustrating one embodiment of a user interface of an electronic device for identifying an unknown contact.

FIG. 3A depicts one embodiment of the electronic device 300 receiving an incoming call. The user interface 302 displays caller identification information 304, including the caller's name ("Robert Smith") and the caller's number ("555-555-5555"). In response to detecting the incoming call, the electronic device 300 determines whether the caller is an unknown contact by searching the user's contacts database (or address book) and/or by searching the user's recent call history. Here, the incoming caller (Robert Smith) is an unknown contact. Accordingly, the electronic device 300 gathers relationship information regarding the unknown contact in order to determine a relationship to the user. In some embodiments, the electronic device 300 queries one or more close contacts for information relating to the unknown contact.

Figure 3B:
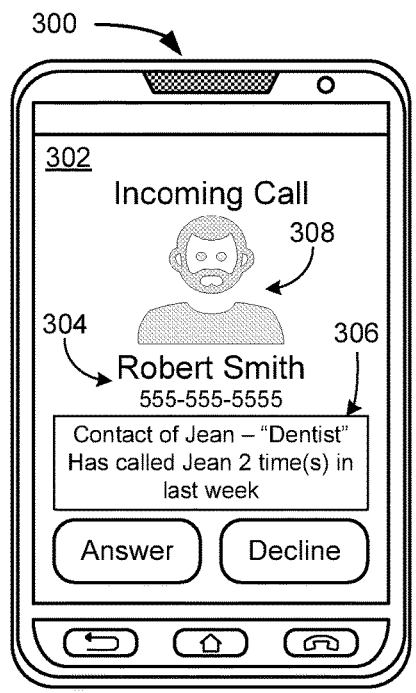
FIG. 3B is a diagram illustrating another embodiment of the user interface of FIG. 3A.

FIG. 3B depicts one embodiment of the electronic device 300 after providing a notification 306 of a relationship between the user and the unknown contact. In some embodiments, the notification 306 is a pop-up window displayed on the user interface 302 near the caller identification information 304. Here, the electronic device 300 has received information from a close contact "Jean" regarding the unknown contact. In some embodiments, the close contact may be a family member, a close friend, a housemate, or the like. In some embodiments, the close contact may share contact information and/or call history regarding the unknown contact.

As depicted, Jean has a contact entry for Robert Smith, the contact entry indicating that Robert Smith is Jean's dentist. Additionally, Jean shares call history information indicating that Robert Smith has called Jean twice in the last week. The electronic device 300 may include this information in the notification 306. In some embodiments, the close contact ("Jean") may share an image 308 (e.g., a photograph) of the unknown contact in response to the close contact having a contact entry matching the unknown contact. In further embodiments, the electronic device 300 may display the shared image 308 on the user interface 302.

Figure 3C:
FIG. 3C is a diagram illustrating another embodiment of the user interface of FIG. 3A.

FIG. 3C depicts another embodiment of the electronic device 300 receiving an incoming video call from a second caller. The user interface 302 display caller identification information 310 for the second caller, including the caller's name ("Sarah Doe"), the caller's address ("sarah.doe@email.com"), and an image of the caller. In response to detecting the incoming video call, the electronic device 300 determines whether the caller is an unknown contact by searching the user's contacts database (or address book) and/or by searching the user's recent call history. Here, the incoming caller (Sarah Doe) is an unknown contact. Accordingly, the electronic device 300 gathers relationship information regarding the unknown contact in order to determine a relationship to the user. In some embodiments, the electronic device 300 queries one or more close contacts for information relating to the unknown contact.

Figure 3D:
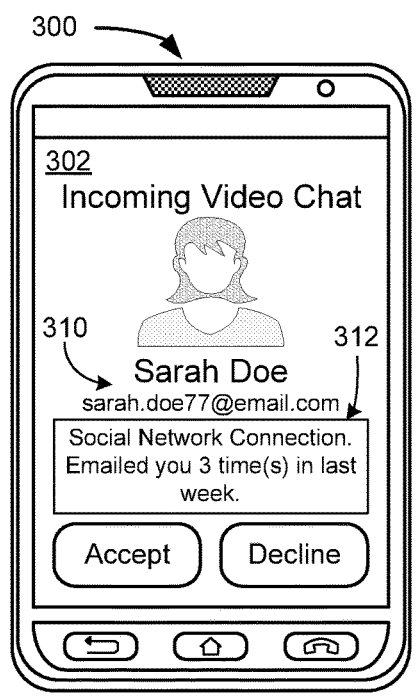
FIG. 3D is a diagram illustrating another embodiment of the user interface of FIG. 3A.

FIG. 3D depicts another embodiment of the electronic device 300 after providing a notification 312 of a relationship between the user and the second caller. In some embodiments, the second notification 312 is a pop-up window displayed on the user interface 302 near the second caller identification information 310. Here, the electronic device 300 has received information from a social network that the user belongs to regarding the unknown contact. In some embodiments, the electronic device 300 searches the user's social network connections for names, numbers, or other personal information matching the unknown contact. In further embodiments, the electronic device 300 queries the social network for a connection type (e.g., family or friend, a level of closeness, a degree of connectedness) between the user and the unknown contact. As depicted, the electronic device 300 indicates in the second notification 312 that Sarah Doe is a social network connection of the user.

Additionally, the electronic device 300 may search for prior communication between the user and Sarah Doe. In certain embodiments, the electronic device 300 searches for an email and/or a text message sent by the unknown contact. In some embodiments, the electronic device 300 may identify a number of messages received within a predetermined time period (e.g., a week). Here, the electronic device 300 determines that the user has received three emails in the last week from Sarah Doe and includes this information in the second notification 312.

Figure 4:
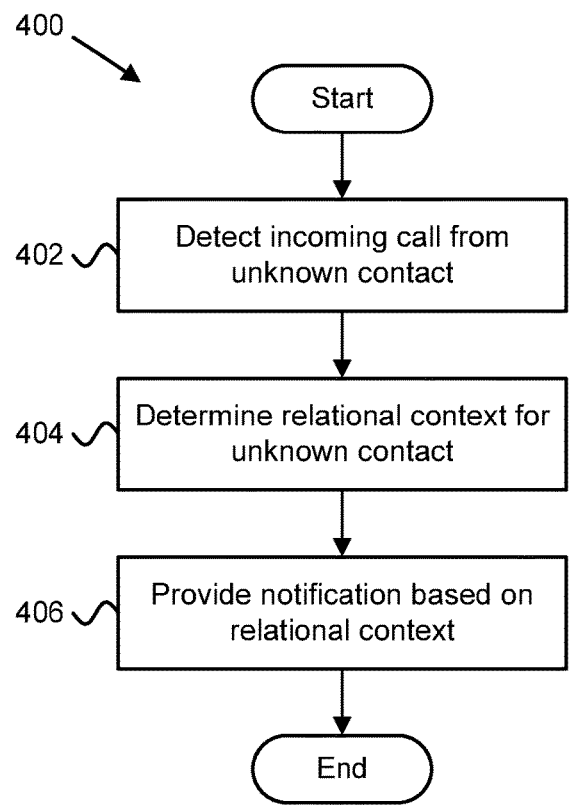
FIG. 4 is a schematic flow chart diagram illustrating one embodiment of a method for identifying an unknown contact.

FIG. 4 depicts a method 400 for identifying an unknown contact, according to embodiments of the disclosure. In some embodiments, the method 400 is performed using an electronic device, such as the electronic device 110, the caller context module 118, and/or the caller context module 200 described above with reference to FIGS. 1-2. In some embodiments, the method 400 is performed by a processor executing program code, for example, a microcontroller, a microprocessor, a central processing unit (CPU), a graphics processing unit (GPU), an auxiliary processing unit, a FPGA, or the like.

The method 400 begins and the electronic device detects 402 an incoming call from an unknown contact. In some embodiments, detecting 402 the incoming call from an unknown contact includes determining whether the caller is an unknown contact. The unknown contact may include a caller for which caller ID information (e.g., calling number and/or name) is available, but where the caller is not in the user's contacts and/or where the caller calls the user infrequently (i.e., the number of calls from the caller is below a threshold) and has not called recently (i.e., within a predetermined time period of the current date). In certain embodiments, detecting 402 the incoming call from an unknown contact includes searching a local contact list for the unknown caller. In certain embodiments, detecting 402 the incoming call from an unknown contact includes searching a call history for prior calls with the unknown caller within a predetermined time period.

The electronic device then determines 404 relational context for the unknown contact. In certain embodiments, determining 404 relational context includes collecting relationship information regarding the unknown contact. In certain embodiments, determining 404 relational context includes searching a shared contacts database for relationship information regarding the unknown contact. In certain embodiments, determining 404 relational context includes polling close contacts for information regarding prior communications between a close contact and the unknown contact, the relational context being based on the information regarding prior communications between a close contact and the unknown contact.

In certain embodiments, determining 404 relational context includes searching for prior communications between the user and the unknown contact. In certain embodiments, determining 404 relational context includes searching transcribed phone calls for relational cues. Relational cues are keywords or other indicators of a relationship between the sender and the recipient. Relational cues may indicate a type of relationship between the sender and the recipient, for example a personal relationship (e.g., friendship, classmates), a familial relationship (e.g., siblings, parent/child, cousins, etc.), or a professional relationship.

Next, the electronic device provides 406 a notification based on the relational context. Where prior communication between the user and the unknown contact was discovered, the notification may include an indication of the prior communication (e.g., a date and time of the latest communication). In some embodiments, providing 406 the notification may include displaying a pop-up notice. In certain embodiments, providing 406 the notification may include providing a temporary notification. In certain embodiments, providing 406 the notification may include displaying a relationship of the unknown contact to the user. For example, the notification may indicate that the caller is a contact, or other associate (e.g., doctor or mechanic), of a family member of the user. The method 400 ends.

Figure 5:
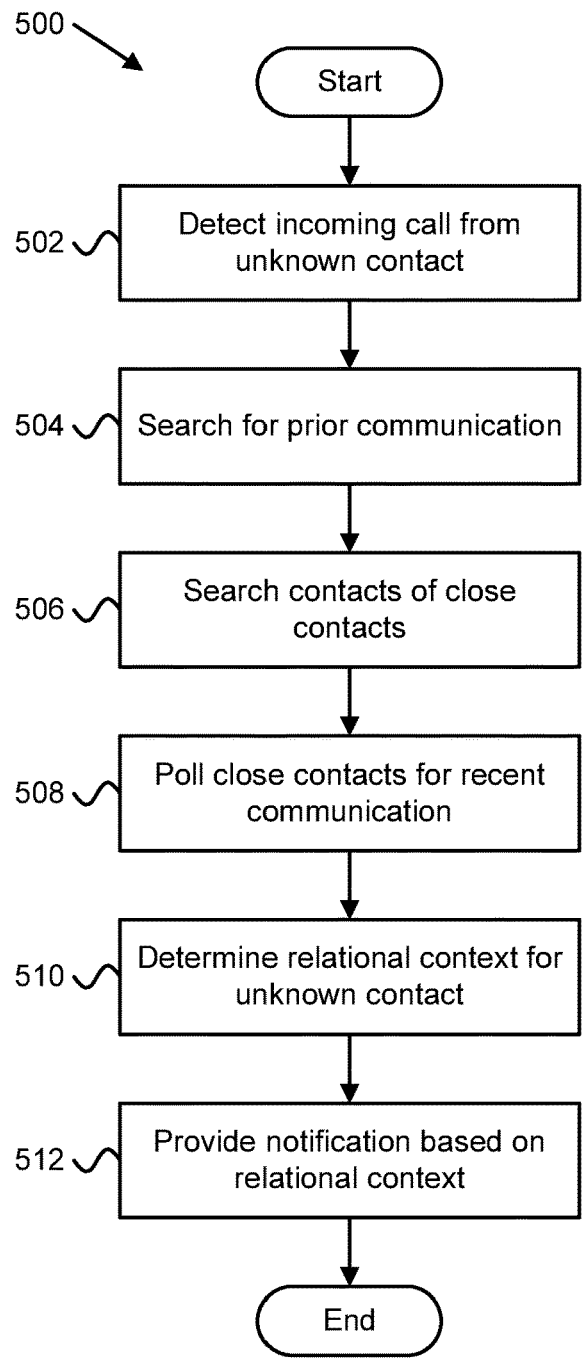
FIG. 5 is a schematic flow chart diagram illustrating another embodiment of a method for identifying an unknown contact.

FIG. 5 depicts a method 500 for identifying an unknown contact, according to embodiments of the disclosure. In some embodiments, the method 500 is performed using an electronic device, such as the electronic device 110, the caller context module 118, and/or the caller context module 200 described above with reference to FIGS. 1-2. In some embodiments, the method 500 is performed by a processor executing program code, for example, a microcontroller, a microprocessor, a central processing unit (CPU), a graphics processing unit (GPU), an auxiliary processing unit, a FPGA, or the like.

The electronic device begins and detects 502 incoming call from unknown contact. In some embodiments, detecting 502 the incoming call from an unknown contact includes determining whether the caller is an unknown contact. The unknown contact may include a caller for which caller ID information (e.g., calling number and/or name) is available, but where the caller is not in the user's contacts and/or where the caller calls the user infrequently (i.e., the number of calls from the caller is below a threshold) and has not called recently (i.e., within a predetermined time period of the current date). In certain embodiments, detecting 502 the incoming call from an unknown contact includes searching a local contact list for the unknown caller. In certain embodiments, detecting 502 the incoming call from an unknown contact includes searching a call history for prior calls with the unknown caller within a predetermined time period, any communications outside this time period being considered not recent.

The electronic device then searches 504 for prior communications between the user and the unknown contact. In some embodiments, the electronic device searches for recent electronic messages, including text messages (e.g., SMS messages, MMS messages, emails, and the like). For example, the electronic device may determine that several text messages have been received from the unknown contact within the last week. In certain embodiments, the electronic device searches for relational cues within the prior electronic messages. Relational cues are keywords or other indicators of a relationship between the sender and the recipient. Relational cues may indicate a type of relationship between the sender and the recipient, for example a personal relationship (e.g., friendship, classmates, teammates, etc.), a familial relationship (e.g., siblings, parent/child, cousins, etc.), or a professional relationship (e.g., coworker, professional acquaintance, service provider, etc.). In some embodiments, the electronic device searches for prior calls that are not recent. For example, the electronic device may search for evidence that the user has previously accepted calls from the unknown contact.

Next, the electronic device searches 506 the contacts (e.g., a contacts list or database) of one or more of the user's close contacts for records matching the unknown contact's information (e.g., name or phone number). In some embodiments, the electronic device polls the one or more close contacts for contacts entries matching the unknown contact's information. In other embodiments, the electronic device searches a shared contacts database for entries matching the unknown contact's information, the shared contacts database maintained by the user and the one or more close contacts.

The electronic device then polls 508 the one or more close contacts for recent communications with the unknown contact. In some embodiments, the electronic device polls for recent phone calls. In some embodiments, the electronic device polls for recent electronic messages, including text messages (e.g., SMS messages, MMS messages, emails, and the like). In certain embodiments, the electronic device polls for communications with the unknown contact that have occurred within a predetermined time period, any communications outside this time period being considered not recent.

Next, the electronic device determine 510 relational context for the unknown contact. In certain embodiments, determining 510 the relational context includes determining a relationship between the user and the unknown contact. The relationship may be based on a relationship between the user and a close contact (e.g., family member or close friend) that has had prior communications with the caller. In some embodiments, the relational context is determined 510 based on prior communications between the unknown contact and the user and on information obtained from the one or more close contacts, including whether the unknown contact is a contact of a close contact or has recently communicated with a close contact. In certain embodiments, the relational context is determined 510 based on relational cues within the prior communications. In certain embodiments, the relational context is determined 510 based on information regarding the unknown contact in a close contact's contact list. For example, notes, titles, occupations, and other information regarding the unknown contact may be used to determine a relationship between the user and the unknown contact.

The electronic device then provides 512 a notification to the user based on the relational context. Where prior communication between the user and the unknown contact was discovered, the notification may include an indication of the prior communication (e.g., a date and time of the latest communication). In some embodiments, providing 512 the notification may include displaying a pop-up notice. In certain embodiments, providing 512 the notification may include providing a temporary notification. In certain embodiments, providing 512 the notification may include displaying a relationship of the unknown contact to the user. For example, the notification may indicate that the caller is a contact, or other associate (e.g., doctor or mechanic), of a family member of the user. The method 500 ends.

Figure 6:
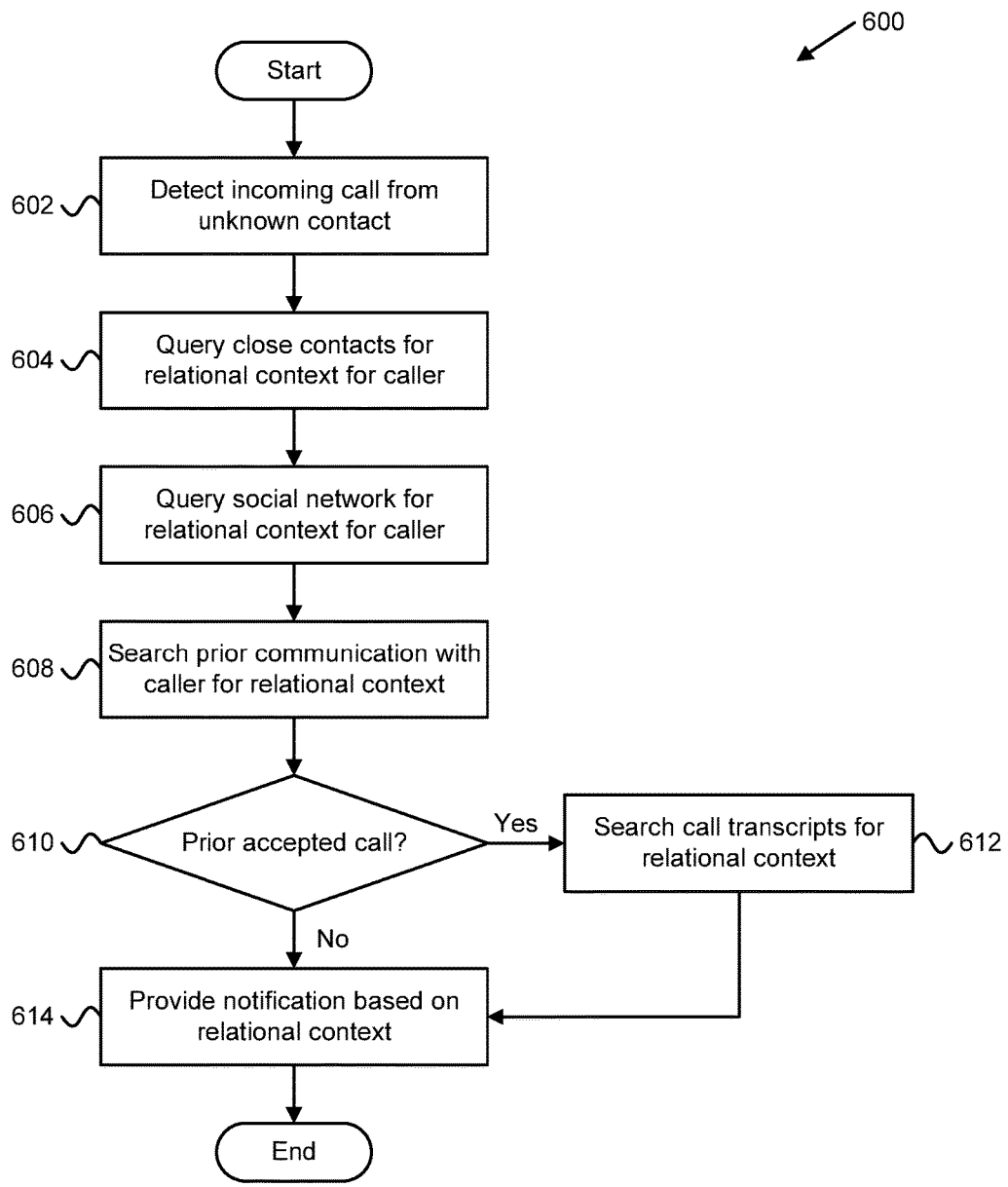
FIG. 6 is a schematic flow chart diagram illustrating another embodiment of a method for identifying an unknown contact.

FIG. 6 depicts a method 600 for identifying an unknown contact, according to embodiments of the disclosure. In some embodiments, the method 600 is performed using an electronic device, such as the electronic device 110, the caller context module 118, and/or the caller context module 200 described above with reference to FIGS. 1-2. In some embodiments, the method 600 is performed by a processor executing program code, for example, a microcontroller, a microprocessor, a central processing unit (CPU), a graphics processing unit (GPU), an auxiliary processing unit, a FPGA, or the like.

The electronic device begins and detects 602 incoming call from unknown contact. In some embodiments, detecting 602 the incoming call from an unknown contact includes determining whether the caller is an unknown contact. The unknown contact may include a caller for which caller ID information (e.g., calling number and/or name) is available, but where the caller is not in the user's contacts and/or where the caller calls the user infrequently (i.e., the number of calls from the caller is below a threshold) and has not called recently (i.e., within a predetermined time period of the current date). In certain embodiments, detecting 602 the incoming call from an unknown contact includes searching a local contact list for the unknown caller. In certain embodiments, detecting 602 the incoming call from an unknown contact includes searching a call history for prior calls with the unknown caller within a predetermined time period.

The electronic device then queries 604 one or more close contacts for relational context for the caller (e.g., the unknown contact). In some embodiments, querying 604 a close contact for relational context includes querying for an indication of prior communication between the close contact and the unknown contact, for contact entries corresponding to the unknown contact, or for a relationship (e.g., familial, personal, or professional) between the close contact and the unknown caller. In some embodiments, querying 604 a close contact for relational context includes polling the contact for recent communications with the unknown contact. Recent communications may include for recent phone calls or recent electronic messages, including text messages (e.g., SMS messages, MMS messages, emails, and the like).

Next, the electronic device queries 606 a social network for relational context for the caller (e.g., the unknown contact). In some embodiments, querying 606 the social network includes searching the user's social network connections for names, numbers, or other personal information matching the unknown contact. For example, if a call is received from a Jane Doe, the electronic device may access one or more social networks to which the user belongs and search for contacts or connections in the social network matching the name Jane Doe or Jane Doe's number, as indicated by caller ID. In further embodiments, querying 606 the social network includes querying for a connection type (e.g., a level of closeness, a degree of connectedness) between the user and the unknown contact.

In some embodiments, querying 606 the social network for relational context includes identifying an activity level between the user and the unknown contact based on social network activities between the user and the unknown contact. The activity level (and thus the relational context) may be based on a frequency of communications between the user and the unknown contact (e.g., messaging via the social network), a number of interactions between the user's social network account and the unknown contact's account (e.g., posting or commenting on each other's accounts), and the like. For example, the electronic device may discover that unknown contact is a longtime acquaintance of the user, but has little interaction with the user via the social network.

The electronic device then searches 608 prior communication between the unknown contact (e.g., the caller) and the user for relational context. In some embodiments, searching 608 the prior communication includes searching for recent electronic messages, including text messages (e.g., SMS messages, MMS messages, emails, and the like). For example, the electronic device may determine that several text messages have been received from the unknown contact within the last week. In certain embodiments, searching 608 the prior communication includes searching for relational cues within the prior electronic messages. Relational cues are keywords or other indicators of a relationship between the sender and the recipient. Relational cues may indicate a type of relationship between the sender and the recipient, for example a personal relationship (e.g., friendship, classmates, teammates, etc.), a familial relationship (e.g., siblings, parent/child, cousins, etc.), or a professional relationship (e.g., coworker, professional acquaintance, service provider, etc.).

Next, the electronic device determines 610 whether the user accepted a prior call from the unknown contact (e.g., the caller). In some embodiments, determining 610 whether the user accepted a prior call includes searching a call history for prior calls that are not recent. For example, the electronic device may search for evidence that the user has previously accepted calls from the unknown contact. In certain embodiments, determining 610 whether the user accepted a prior call includes determining whether a call transcript exists for a prior accepted call. For example, the electronic device may automatically transcribe at least a beginning portion of the phone call from an unknown contact.

If the electronic device determines that a prior call was accepted—and, optionally, that a call transcript exists, then the electronic device searches 612 one or more call transcripts corresponding to the prior call for relational context. Otherwise, if the electronic device determined that no prior call was accepted, then the electronic device provides 614 a notification to the user based on the relational context.

Searching 612 a call transcript for relational context, in one embodiment, includes searching for one or more descriptors of the caller. As a caller will often identify himself/herself in the beginning portion of the phone call, searching 612 the call transcript may identify descriptors of the caller—such as name, title, occupation, and the like—within the transcribed portion of the phone call. Thus, the call transcript may include In some embodiments, searching 612 a call transcript for relational context includes searching the call transcript for relational cues or other information used to determine relational context, for example a relationship between the caller and the user. In response to searching 612 the call transcript, the electronic device proceeds to provide 614 a notification to the user based on the relational context.

Providing 614 the notification based on the relational context, in one embodiment, may include providing a temporary notification. For example, the notification may disappear (e.g., fade away) after a predetermined time. In some embodiments, providing 614 the notification may include displaying a pop-up notice. In some embodiments, providing 614 the notification may include providing an audible notification, such as a computer-generated voice. Where prior communication between the user and the unknown contact was discovered, the notification may include an indication of the prior communication (e.g., a date and time of the latest communication).

In certain embodiments, providing 614 the notification includes identifying a relationship between the user and the unknown contact, including that no prior relationship exists. In some embodiments, the relationship between the user and the unknown contact may include a relationship type (e.g., friend, family, acquaintance, coworker, classmate, social network connection, or service provider). For example, the notification may indicate that the caller is a contact, or other associate (e.g., doctor or mechanic), of a family member of the user. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
a processor;
a memory that stores code executable by the processor to:
detect an incoming call;
identify that the incoming call is from a caller that is not a saved contact;

identify one or more close contacts saved in the memory with whom sharing of contact information and communication history is permitted;
collect relationship information regarding the caller that is not a saved contact in response to identifying that the caller that is not a saved contact, wherein collecting relationship information comprises at least one of:
requesting information of recent communications with the caller that is not a saved contact from the identified one or more close contacts, and
requesting contact information associated with the caller that is not a saved contact from the identified one or more close contacts;
determine a relationship of the caller that is not a saved contact to a close contact based on the collected relationship information;
notify the user of the incoming call; and
provide, to the user, an indication of the relationship prior to the user answering the incoming call.

2. The apparatus of claim 1, further comprising a display, wherein notifying a user of the incoming call comprises the processor presenting caller identification data on the display, and wherein providing the indication of the relationship comprises the processor presenting the determined relationship on the display at a location near the caller identification data.

3. The apparatus of claim 1, wherein the processor further identifies a shared contacts database, wherein collecting relationship information comprises searching the shared contacts database.

4. The apparatus of claim 1, wherein the processor further transcribes at least a beginning portion of a phone call, wherein determining a relationship comprises identifying relational cues within the transcribed portion.

5. The apparatus of claim 4, wherein collecting relationship information regarding the caller that is not a saved contact further comprises searching transcribed portions of prior phone calls.

6. The apparatus of claim 1, wherein the processor further shares the determined relationship with one or more stored contacts.

7. The apparatus of claim 1, wherein collecting relationship information comprises analyzing content of prior communication between the recipient and the caller that is not a saved contact, wherein the processor further searches for a prior communication with the caller that is not a saved contact.

8. The apparatus of claim 7, wherein the prior communication is an electronic communication selected from the group consisting of an electronic mail message, a short messaging service (SMS) message, and a multimedia messaging service (MMS) message.

9. The apparatus of claim 7, wherein the prior communication comprises prior phone calls.

10. The apparatus of claim 1, wherein identifying the one or more close contacts comprises searching a database of saved contacts for one or more contacts having a special indicator.

11. A method comprising:
receiving an incoming call;
detecting, by use of a processor, that the incoming call is from a caller that is not a saved contact;
identifying one or more close contacts of a recipient of the incoming call with whom sharing of contact information and communication history is permitted;
collecting relationship information regarding the caller that is not a saved contact in response to detecting that the incoming call is from a caller that is not a saved contact, wherein collecting relationship information comprises at least one of:
requesting information of recent communications with the caller that is not a saved contact from the identified one or more close contacts, and
requesting contact information associated with the caller that is not a saved contact from the identified one or more close contacts;
determining a relational context for the caller that is not a saved contact from the collected relationship information;
notifying a user of the incoming call; and
providing, to the user, an indication of the relational context prior to the user answering the incoming call.

12. The method of claim 11, wherein the relational context is further based on a relationship between the user and a close contact having prior communications with the caller that is not a saved contact.

13. The method of claim 11, wherein collecting relationship information regarding the caller that is not a saved contact comprises analyzing content of prior communication between the recipient and the caller that is not a saved contact, the method further comprising identifying a prior communication with the caller that is not a saved contact, wherein the provided indication includes an indication of the prior communication.

14. The method of claim 13, wherein the indication of the prior communication identifies a most recent communication.

15. The method of claim 11, further comprising sending the relational context to one or more recipients selected from the group consisting of: a shared contacts database, a remote server, and a close contact.

16. The method of claim 11, wherein detecting that an incoming call is from the caller that is not a saved contact comprises searching a local contact list for the caller that is not a saved contact.

17. The method of claim 11, wherein detecting that an incoming call is from the caller that is not a saved contact comprises searching a call history for prior calls with the caller that is not a saved contact within a predetermined time period.

18. The method of claim 11, wherein identifying the one or more close contacts comprises searching a database of saved contacts for one or more contacts having a special indicator.

19. A program product comprising a computer readable storage medium that is not a transitory signal and that stores code executable by a processor, the executable code comprising code to:
receive an incoming call;
detect that an incoming call is from a caller that is not a saved contact;
identify one or more close contacts of a recipient of the incoming call with whom sharing of contact information and communication history is permitted;
collect relationship information regarding the caller that is not a saved contact in response to detecting that the incoming call is from a caller that is not a saved contact, wherein collecting relationship information comprises at least one of:
requesting information of recent communications with the caller that is not a saved contact from the identified one or more close contacts, and requesting contact information associated with the caller that is not a saved contact from the identified one or more close contacts;

determine a relational context for the caller that is not a saved contact based on the collected relationship information;

notify the user of the incoming call; and provide, to a user, a notification indicating the relational context prior to the user answering the incoming call.

20. The program product of claim 19, wherein collecting relationship information regarding the caller that is not a saved contact comprises analyzing content of prior communication between the recipient and the caller that is not a saved contact, wherein analyzing content of prior communication between the recipient and the caller that is not a saved contact comprises searching for prior communications between the user and the caller that is not a saved contact.

* * * * *